US012622417B2

(12) United States Patent　　　　(10) Patent No.:　US 12,622,417 B2
Salyer et al.　　　　　　　　　　　　(45) Date of Patent:　　May 12, 2026

(54) CAT WAND

(71) Applicant: The Kyjen Company, LLC,
　　　　　　　Centennial, CO (US)

(72) Inventors: Danielle Salyer, Denver, CO (US);
　　　　　　　Chaz Ozzello, Englewood, CO (US)

(73) Assignee: The Kyjen Company, LLC,
　　　　　　　Centennial, CO (US)

( * ) Notice:　Subject to any disclaimer, the term of this
　　　　　　　patent is extended or adjusted under 35
　　　　　　　U.S.C. 154(b) by 0 days.

(21) Appl. No.: 18/651,342

(22) Filed:　　Apr. 30, 2024

(65)　　　　　Prior Publication Data

US 2024/0365750 A1　　Nov. 7, 2024

Related U.S. Application Data

(60) Provisional application No. 63/463,307, filed on May
　　2, 2023.

(51) Int. Cl.
　　*A01K 15/02*　　　　(2006.01)
(52) U.S. Cl.
　　CPC ...... *A01K 15/0257* (2025.08); *A01K 15/0252*
　　　　　　　　　　　　　　　　　　　(2025.08)
(58) Field of Classification Search
　　CPC .................................................... A01K 15/025
　　USPC .............. 124/5, 41.1, 17; 473/505–509, 514,
　　　　　　　　473/423–426, 422, 516, 615, 576, 430;
　　　　　　　　　　　　　　　　　　　　119/707–711
　　See application file for complete search history.

(56)　　　　　　References Cited

U.S. PATENT DOCUMENTS

| | | | | |
|---|---|---|---|---|
| 3,907,287 | A | * | 9/1975 | Fox ..................... A63B 69/0088 |
| | | | | 473/424 |
| 5,357,904 | A | * | 10/1994 | Takahashi ............ A01K 15/025 |
| | | | | 428/11 |
| 5,474,032 | A | * | 12/1995 | Krietzman ........... A01K 15/025 |
| | | | | 473/430 |
| 6,401,665 | B1 | * | 6/2002 | Gentile ................ A01K 15/025 |
| | | | | 119/707 |
| 7,476,166 | B2 | * | 1/2009 | Yearick .................. A63B 59/20 |
| | | | | 473/505 |
| 8,997,695 | B2 | * | 4/2015 | Riding ................. A01K 15/025 |
| | | | | 119/707 |
| 2004/0082263 | A1 | * | 4/2004 | Parrish ................... A63H 33/22 |
| | | | | 446/245 |
| 2005/0150468 | A1 | * | 7/2005 | Fleischhacker ...... A01K 15/025 |
| | | | | 119/708 |
| 2019/0289823 | A1 | * | 9/2019 | Renforth ............ B65H 75/4473 |

* cited by examiner

*Primary Examiner* — Magdalena Topolski
*Assistant Examiner* — Nevena Aleksic
(74) *Attorney, Agent, or Firm* — Lempia Summerfield
Katz LLC

(57)　　　　　　　ABSTRACT

Provided is a pet toy including a handle, a shaft including a
launching protrusion, the shaft extending from the handle, a
cord coupled to the shaft, and a toy assembly. The toy
assembly is removably attachable to the cord or engageable
with the launching protrusion. In a first configuration of the
pet toy, the toy assembly is removably coupled to the cord.
In a second configuration of the pet toy, the toy assembly is
launchable from the launching protrusion.

7 Claims, 5 Drawing Sheets

400

S101 — Wrap the elastic loop around the launching protrusion.

S103 — Pull the toy assembly backward, stretching the elastic loop.

S105 — Release the toy assembly.

510

512

511

CAT WAND

This application claims the benefit of priority to U.S. Provisional Application entitled "Cat Wand," filed May 2, 2023, and assigned Ser. No. 63/463,307, the entire disclosure of which is hereby expressly incorporated by reference.

BACKGROUND OF THE DISCLOSURE

Field of the Disclosure

The disclosure relates generally to pet toys, and more specifically, to interactive pet toys including multiple functionalities configured to mentally stimulate pets.

Brief Description of Related Technology

Generally, a wide variety of pet toys are available to keep pets entertained. For example, pet toys including one or more of a squeaker, a bell, crinkle paper, and the like may be configured to make noise, entertaining pets. Other pet toys include balls, frisbees, wands, toys including treats (e.g., cat nip, pet treats), chew toys, and the like. However, pets may quickly become disinterested in their toys. Accordingly, there is a need for more dynamic and interactive pet toys including multiple functionalities that engage pets for longer periods of time.

SUMMARY OF THE DISCLOSURE

In accordance with one aspect of the present disclosure, a pet toy includes a handle, a shaft including a launching protrusion extending from the handle, a cord coupled to the shaft, and a toy assembly. The toy assembly is removably attachable to the cord or engageable with the launching protrusion. In a first configuration of the pet toy, the toy assembly is removably coupled to the cord and in a second configuration of the pet toy, the toy assembly is launchable from the launching protrusion.

In accordance with another aspect of the present disclosure, a pet toy includes a handle, a shaft extending from the handle, and a toy assembly. The shaft includes a launching protrusion and a coil portion disposed between the handle and the launching protrusion. The toy assembly is configured to be launched from the launching protrusion.

In accordance with yet another aspect of the present disclosure, a method of launching a toy assembly with a wand, the wand comprising a handle, a shaft including a launching protrusion and a coil disposed between the handle and the launching protrusion is provided. The method includes wrapping an elastic loop of the toy assembly around the launching protrusion, pulling the toy assembly backward, stretching the elastic loop, and releasing the toy assembly. When the toy assembly is released, an elastic force of the elastic loop returning to its original shape launches the toy assembly forward.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
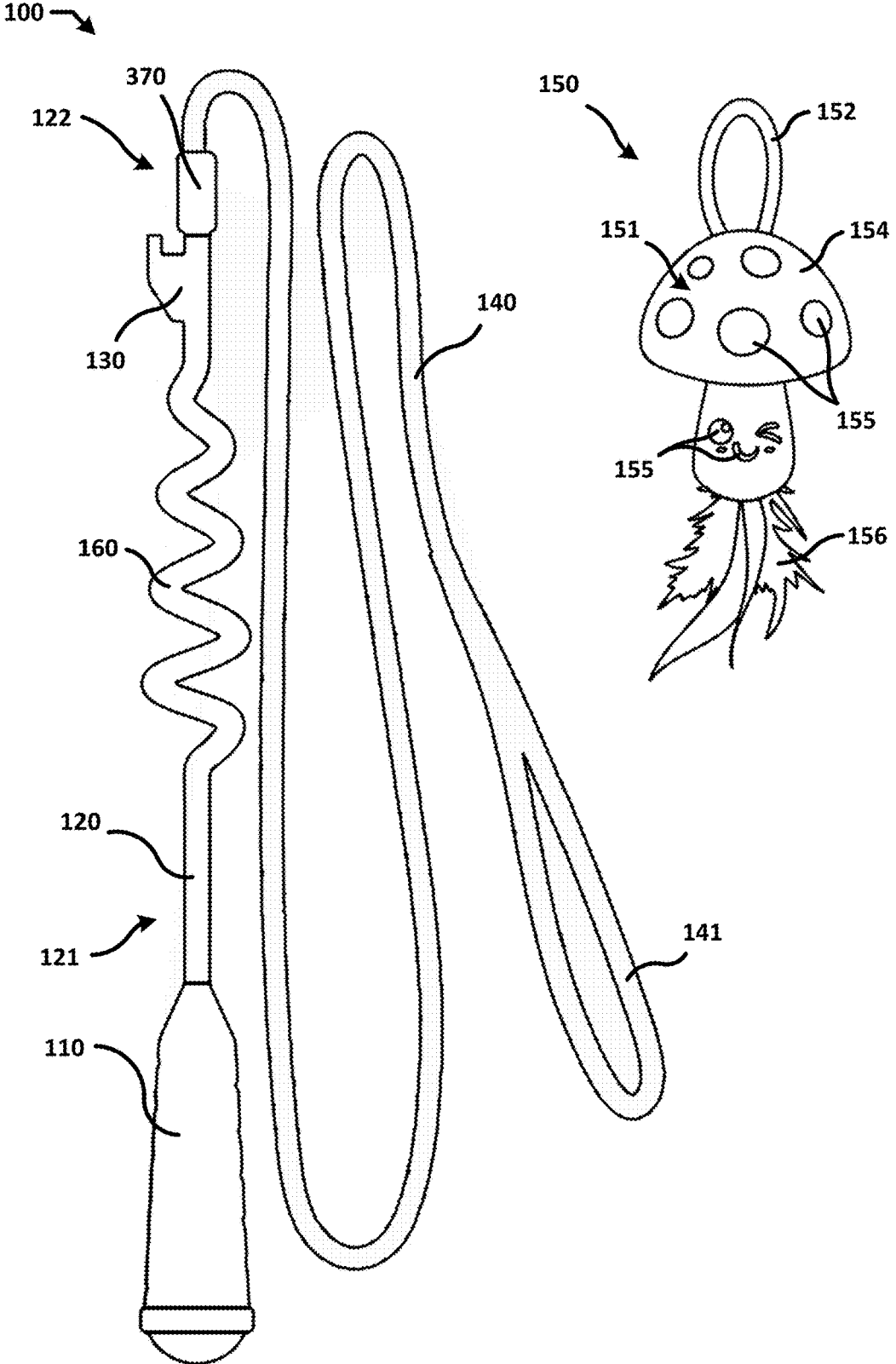
FIG. 1 illustrates a front view of a pet toy in accordance with one example of the present disclosure.

While the disclosed pet toys and methods are susceptible of embodiments in various forms, there are illustrated in the drawings (and will hereafter be described) specific embodiments of the disclosure, with the understanding that the disclosure is intended to be illustrative and is not intended to limit the disclosure to the specific embodiments described and illustrated herein.

DETAILED DESCRIPTION OF THE DISCLOSURE

The present disclosure is provided to solve the above-mentioned problems in the Background of the Disclosure section. Specifically, the present disclosure provides a pet toy having multiple configurations providing different playing functions. A pet toy according to the present disclosure may include a handle, a shaft extending from the handle, a cord coupled to the shaft and a toy assembly or toy accessory. The shaft may include a launching protrusion. In a first configuration, the toy assembly may be coupled to the cord and in a second configuration the toy assembly may be launched from the launching protrusion.

A pet toy according to the present disclosure may provide a dynamic playing experience including multiple playing functionalities capable of capturing and holding the attention of pets for longer periods of time. The toy assembly may include a body and a loop, such an elastic loop, coupled to the body. In the first configuration, the toy assembly may be coupled to the cord of the pet toy. Specifically, the elastic loop of the toy assembly may be coupled to the cord of the pet toy. Accordingly, when a human holds the handle of the pet toy, the toy assembly may hang or dangle, via the cord, from the shaft of the pet toy. In the first configuration, a human holding the handle may dangle the toy assembly in front of a pet, enticing the pet to bat at or otherwise play with the toy assembly. In some examples, the toy assembly may include an attractant coupled to the body configured to further attract or capture the attention of a pet.

In the second configuration, the toy assembly may be launched from the launching protrusion. Specifically, a human may hold the pet toy (e.g., the handle) with a first hand and with a second hand, the human may provide or wrap the elastic loop of the toy assembly around the launching protrusion and pull the toy assembly toward themselves, stretching the elastic loop which is resisted by the launching protrusion. The toy assembly may subsequently be released or let go of when the elastic loop is in a stretched state, such that the toy assembly is launched from the launching protrusion. Specifically, when the toy assembly is released, an elastic force of the elastic loop returning to its original (e.g., natural, unstretched) state may propel or launch the toy assembly forward or backward (i.e., away from the launching protrusion).

For clarity of disclosure, the terms "backward" and "forward" are defined herein relative to a human holding the pet toy and a launching protrusion of the pet toy. The term "backward" refers to a direction behind the launching protrusion, toward a human holding the pet toy. The term "forward" refers to a direction in front of the launching protrusion, away from a human holding the pet toy.

According to some examples, the shaft of the pet toy may further include a coiled portion. The coiled portion may be disposed between the handle and the launching protrusion. The coiled portion may be configured to elastically deform as the elastic loop of the toy assembly is stretched against the launching protrusion. When the toy assembly is released, an elastic force of the coiled portion returning to its original (e.g., natural, unstretched) state may be exerted, via the launching protrusion, on the toy assembly, supplementing the elastic force of the elastic loop and propelling or launching the toy assembly away from the launching protrusion. In other words, the coiled portion adds inertia to the end of the shaft and thus the toy assembly coupled therewith.

According to some examples, as described below in greater detail, a toy assembly according to the present disclosure may include one or more of cat nip, bright colors, distinct or contrasting colors or images, distinct textures, and contrasting textures to attract or capture the attention of a pet.

Referring to FIG. 1, a pet wand or pet toy 100 is illustrated in accordance with one example of the present disclosure. As shown in FIG. 1, the pet toy 100 may include a handle 110, a shaft 120 extending from the handle 110, a launching protrusion 130 extending from the shaft 120, a cord 140 coupled to the shaft 120, and a toy assembly 150. The toy assembly may include a body 151 and an elastic loop 152.

The handle 110 may be configured to be held by a human playing with a pet. The handle 110 may have an ergonomic shape so as to be comfortably held within a (e.g., single) hand of a human. As described hereinafter in greater detail, the handle 110 may be configured to be held within the hand of a human playing with a pet in both configurations of the pet toy 100. In some examples, as illustrated in FIG. 1, the handle 110 may have a frustoconical shape. However, the present disclosure is not limited thereto and in other examples the handle 110 may have another elongate shape, a cylindrical shape, or a parallelepiped shape. Other shapes are possible. In some examples, the handle 110 may be made of a plastic or plastics, such as polypropylene (PP), polyethylene, polycarbonate, or other similar materials. In other examples, the handle 110 may be comprised of another material.

The shaft 120 may extend from the handle 110 of the pet toy 100. In some examples, as described hereinafter in greater detail with respect to FIG. 3, the shaft 120 may be formed separately from and subsequently coupled to the handle 110. In other examples, the handle 110 and the shaft 120 may be integrally formed as a single element of the pet toy 100. According to some examples, the shaft 120 may have a circular cross-sectional shape; however, the present disclosure is not limited thereto. In other examples, the shaft 120 may have a polygonal, elliptical, oval, or another cross-sectional shape. In some examples, the shaft 120 may be made of a plastic or plastics, such as polypropylene (PP), polyethylene, polycarbonate, or other similar materials. In other examples, the shaft 120 may be comprised of another material. The shaft 120 includes a proximal end 121 disposed at or adjacent to the handle 110 and a distal end 122 opposite the proximal end 121. The distal end 122 is disposed further away from the handle 110 than the proximal end 121.

Figure 2:
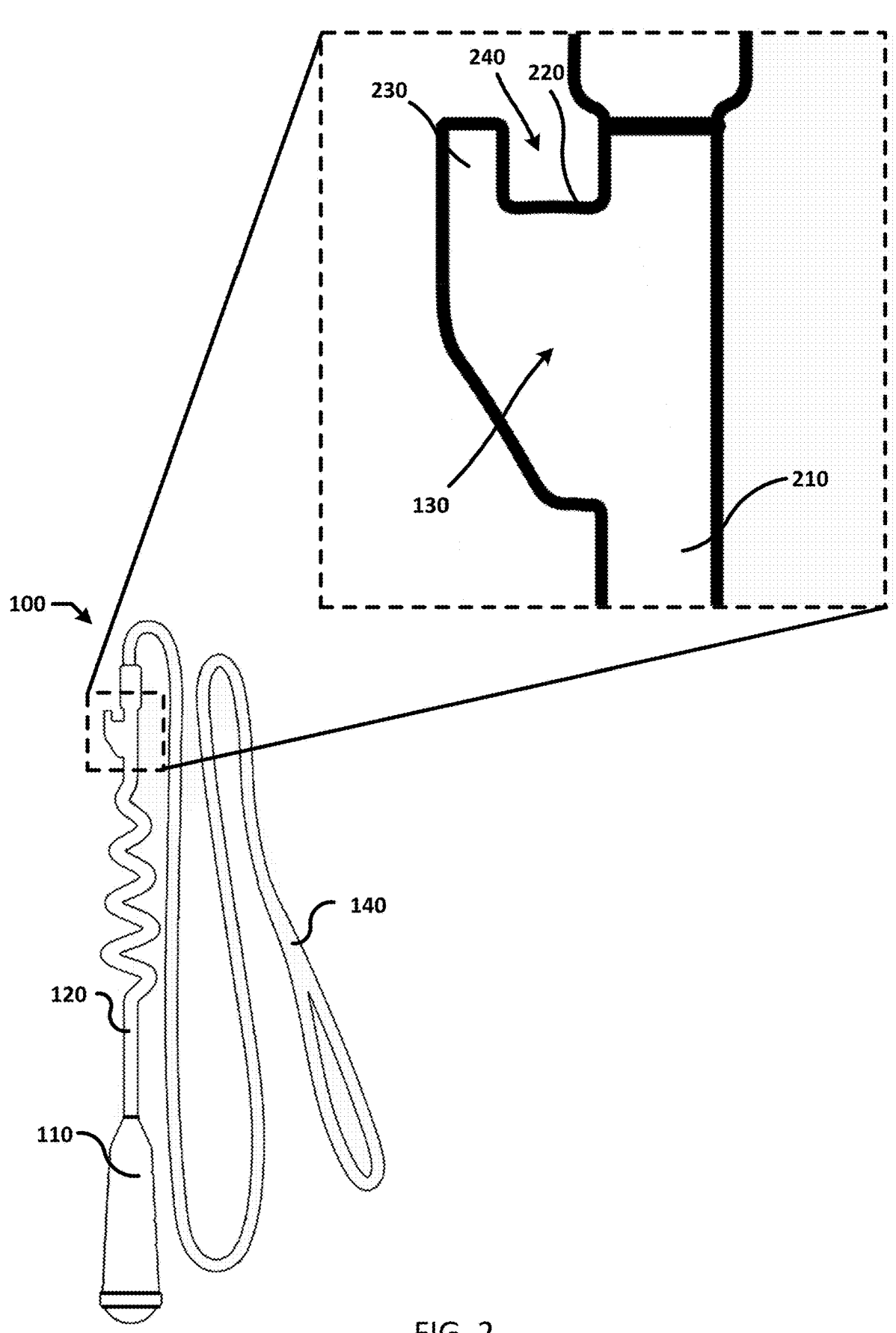
FIG. 2 illustrates an enlarged view of a launching protrusion of the pet toy of FIG. 1 in accordance with one example of the present disclosure.

The shaft 120 may include a launching protrusion 130. The launching protrusion 130 may be disposed at or near a distal end 122 of the shaft 120. Referring to FIG. 2, an enlarged view of the launching protrusion 130 is shown in accordance with an example of the present disclosure. As shown in FIG. 2, the launching protrusion 130 may extend or protrude away from a body 210 (e.g., cylindrical body, based on a shaft having a circular cross-sectional shape) of the shaft 120. In some examples, the launching protrusion 130 may extend from the body 210 of the shaft 120 in a direction perpendicular to a primary axis along which the shaft 120 extends.

The launching protrusion 130 may include a leading surface 220. In some examples, as shown in FIG. 2, the leading surface 220 may be perpendicular to a primary axis along which the shaft 120 extends. The launching protrusion 130 may further include a projection 230 extending from the leading surface 220. The projection 230 may be offset from the body 210 of the shaft 120, such that a notch 240 is formed between the projection 230 and the body 210. The notch 240 may be configured to receive a loop, such as an elastic loop, of a toy assembly, for example, an elastic loop 152 of the toy assembly 150 of FIG. 1, for launching the toy assembly. The second configuration of the pet toy 100 in which a toy assembly may be launched from the launching protrusion is described hereinafter with respect to the flowchart 400 of FIG. 4. In some examples, the projection 230 may extend from the leading surface 220 along an axis parallel to the primary axis along which the shaft 120 extends.

Returning to FIG. 1, the shaft 120 may further include a spiraled or coiled portion 160. The coiled portion 160 may be disposed between the handle 110 and the launching protrusion 130. The coiled portion 160 may be configured to elastically deform. Specifically, as described in greater detail hereinafter with respect to the flowchart 400 of FIG. 4, the coiled portion 160 may be configured to elastically deform when the elastic loop 152 of the toy assembly 150 is stretched against the launching protrusion 130. Accordingly, when the toy assembly 150 is released, the coiled portion 160 may be configured to exert an elastic force via the launching protrusion 130, supplementing the elastic force of the elastic loop 152 and propelling or launching the toy assembly 150 forward or backward.

The pet toy 100 may further include a cord 140 coupled to the shaft 120. In some examples, as illustrated in FIG. 1, the cord 140 may be coupled to a distal end 122 of the shaft 120. In other examples, the cord may be coupled to a center or midpoint of the shaft 120. The cord 140 may include a proximal end disposed at or coupled to the shaft 120 and a distal end opposite the proximal end. In some examples, the cord 140 may include a loop 141. Specifically, as illustrated in FIG. 1, a loop 141 may be disposed at a distal end of the cord 140. The cord 140 may be configured to be coupled to the toy assembly 150. In some examples, the loop 141 of the cord 140 may be configured to be coupled to the elastic loop 152 of the toy assembly 150. In some examples, the cord 140 may be made of nylon or another synthetic polymer. In other examples, the cord 140 may be made of another material.

Still referring to FIG. 1, the pet toy 100 may further include a toy assembly 150 (i.e., toy accessory). As noted above and described hereinafter in greater detail, in the first configuration of the pet toy 100 the toy assembly 150 may be coupled to the cord 140 and in the second configuration of the pet toy 100 the toy assembly 150 may launched from the launching protrusion 130 of the pet toy 100. As noted above and shown in FIG. 1, the toy assembly 150 may include a body 151 and a loop 152. The loop 152 may be elastic and may be coupled to and/or extend from the body 151 of the toy assembly 150. The elastic loop 152 may be configured to couple the toy assembly 150 to the cord 140 in the first configuration of the pet toy 100. Additionally, in the second configuration of the pet toy 100, the elastic loop 152 may be configured to elastically deform as it is stretched against the launching protrusion 130 and to propel the toy assembly 150 forward as it returns to its original (e.g., natural, unstretched) state after being released (e.g., by a human stretching the elastic loop 152 against the launching protrusion 130). In this way, the toy assembly 150 is configured to be launchable from the launching protrusion 130.

The body 151 of the toy assembly 150 may include a case or cover 154 and an internal compartment. The cover 154 may define and outer surface of the toy assembly 150. The cover 154 may be comprised of a plush textile. In some examples, the cover 154 may be comprised of a plush textile having pile (e.g., loops or strands) extending from the base textile. The cover 154 may be comprised of a polyester plush textile or fabric.

The internal compartment may be disposed within the cover 154 of the toy assembly 150. In some examples, the cover 154 may define a boundary of the internal compartment. The internal compartment of the toy assembly 150 may be stuffed with a filler material. The filler material may give the body 151 a voluminous, three-dimensional shape. In some examples, the filler material may be made of polyester or another synthetic material. In some examples, the filler material may include catnip in order to attract or capture the attention of a pet. For example, the catnip may encourage a pet to bat at or otherwise play with the toy assembly 150 hanging (e.g., via the cord 140) from the shaft 120 and/or encourage a pet to chase after the toy assembly 150 launched from the launching protrusion 130.

The body 151 of the toy assembly 150 may have various shapes. In some examples, as shown in FIG. 1, the body 151 may be shaped to represent a mushroom. In other examples, the body 151 may be shaped to represent an animal, for example, a mouse. In still other examples, the body 151 may be configured to represent a fruit or vegetable. The body 151 may be shaped to represent or have the shape of any item, object, or living thing.

In some examples, the body 151 may further include one or more designs or images printed and/or embroidered on the cover 154 of the bodies 151, some of which are discussed below. The body 151 may include one or more decorative elements 155. The decorative element(s) 155 may be coupled to the cover 154 of the toy assembly 150. The decorative element 155 may be, for example, a design printed or embroidered on the cover 154. For example, a facial feature or features (e.g., eyes, nose, ears, mouth, eyebrows, or the like) may be printed or embroidered on the cover 154. In some examples, the toy assembly 150 may further include an attractant 156, for example, a tuft of faux fur or feather coupled to the cover 154 of the body 151.

One or more decorative elements 155 and/or attractants 156 may be sewn, glued, or otherwise coupled to the cover 154 of the toy assembly 150. The decorative element(s) 155 and/or attractant(s) 156 may be comprised of a different material, have a different color, and/or have a different texture than the cover 154. Specifically, in some examples, the cover 154 and the decorative element 155 may have different textures, so as to attract a pet. In some examples, a textile or fabric of which the cover 154 is made and a textile or fabric of which the decorative element 155 is made may include pile or strands having different lengths. In other examples, the cover 154 and the decorative element 155 or attractant 156 may have contrasting colors, so as to attract a pet.

In some examples, the toy assembly 150 may further include a noisemaker. The noisemaker may be disposed within the body 151 of the toy assembly 150 (e.g., within the internal component) or coupled to the body 151 as an attractant 156. The noisemaker may be configured to make or produce a noise as the toy assembly 150 (and thus the noisemaker) moves. The noisemaker may include any of a bell, a rattle, crinkle paper, a whistle, a clicker, an electronic noise producing device, or the like, or any combination thereof.

Figure 3:
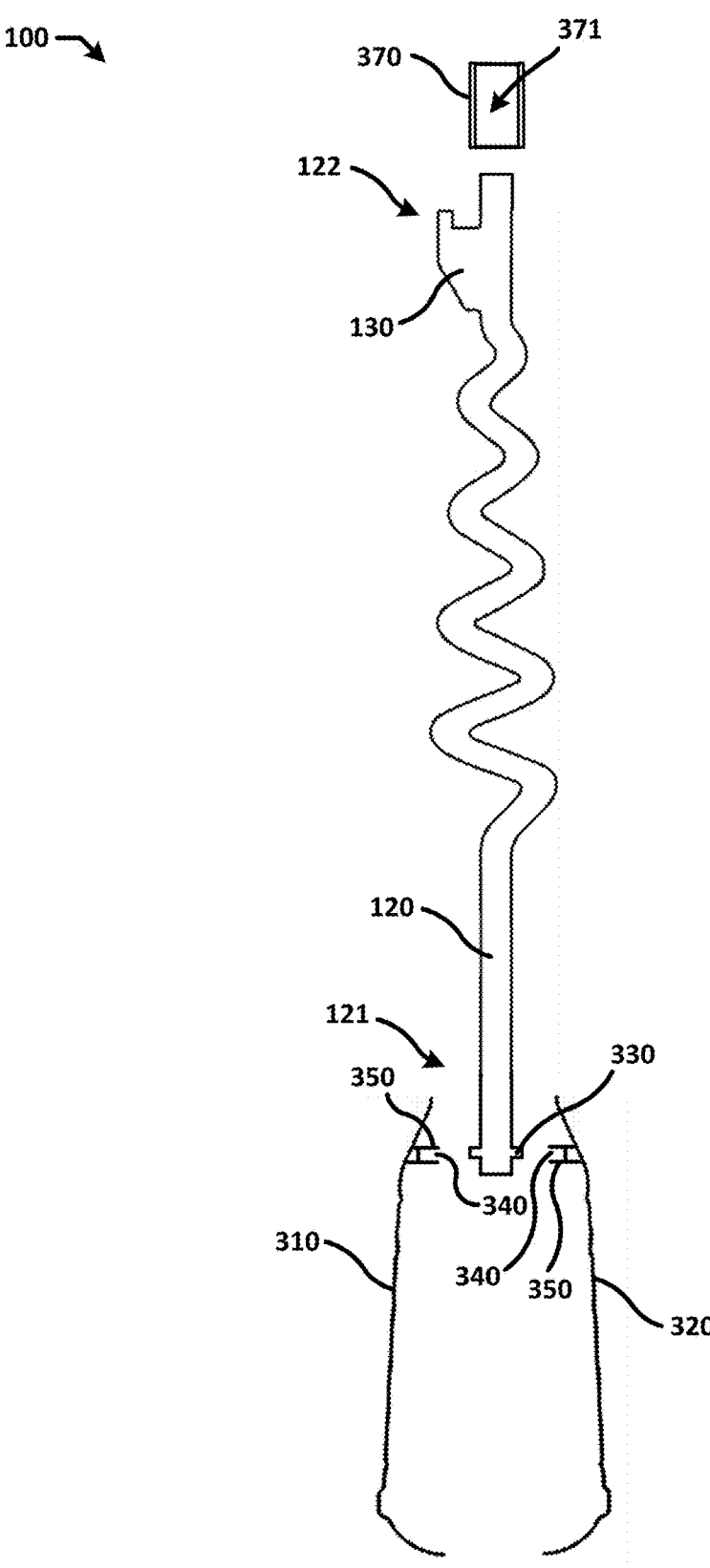
FIG. 3 illustrates a partial exploded cross-sectional view of the pet toy of FIG. 1 in accordance with one example of the present disclosure.

Referring to FIG. 3, a partial exploded cross-sectional view of the pet toy 100 is illustrated in accordance with one example of the present disclosure. As shown in FIG. 3, the handle 110 may consist of a handle first half 310 and a handle second half 320. The handle first half 310 and the handle second half 320 may be formed separately from one another and subsequently coupled together to form the handle 110. For example, the pair of handle halves 310, 320 may be coupled together using a press or interference fit, an adhesive or glue, plastic welding, one or more fasteners (e.g., screws, bolts, rivets), or the like, or any combination thereof.

In some examples, the handle first half 310 and the handle second half 320 may be symmetrical about an interface about which they are coupled to one another. It should be noted that while the terms "first half" and "second half" are used, the handle first half 310 and the handle second half 320, respectively, may not be exactly fifty percent of the handle 110 and may comprise more or less than fifty percent of the handle 110, respectively.

In some examples, a portion of the shaft 120 may be inserted between the handle first half 310 and the handle second half 320 before the pair of handle halves (i.e., handle first half 310 and handle second half 320) are coupled to one another. Specifically, a portion of the proximal end 121 of the shaft 120 including a flange 330 may be provided between the handle first half 310 and the handle second half 320. The handle first half 310 and the handle second half 320 may each include a slot 340 configured to receive the flange 330. One or more walls 350 of the handle first half 310 and the handle second half 320, respectively, may define (e.g., bounds of) the slot 340.

According to some examples, the shaft 120 may be provided between the handle first half 310 and the handle second half 320, such that the flange 330 of the shaft 120 is disposed within the slots 340 of the handle first half 310 and the handle second half 320 when the handle first half 310 and the handle second half 320 are coupled to one another. The flange 330 may be disposed and restrained (e.g., prevented from moving) within the slots 340 of the handle first half 310 and the handle second half 320. Accordingly, the flange 330 and slots 340 (e.g., of the handle first half 310 and the handle second half 320) may prevent the handle 110 and shaft 120 from moving relative to one another.

Referring generally to FIGS. 1 and 3, the pet toy 100 may further include a shaft cap 370. The shaft cap 370 may be coupled to the distal end 122 of the shaft 120. In some examples, the shaft cap 370 may be integrally formed with the shaft 120. In other examples, as shown in FIG. 3, the shaft cap 370 may be formed separately from the shaft 120 and subsequently coupled to shaft 120. For example, the shaft cap 370 may be coupled to the shaft 120 using a press or interference fit, an adhesive or glue, plastic welding, one or more fasteners, or the like, or any combination thereof.

The shaft cap 370 may include a hollow channel 371 extending therethrough. In some examples, the shaft 120 (e.g., the distal end 122) may be inserted into the hollow channel 371 before coupling the shaft cap 370 to the shaft 120.

The shaft cap 370 may facilitate coupling of the cord 140 to the shaft 120. For example, the cord 140 may be inserted into the hollow channel 371 of the shaft cap 370 before being coupled to the shaft 120 and/or the shaft cap 370. Specifically, an end of the cord 140 may be inserted into the hollow channel 371 of the shaft cap 370 before being coupled to the shaft 120 and/or shaft cap 370 using, for example, a press or interference fit, an adhesive or glue, plastic welding, one or more fasteners (e.g., screws, bolts, rivets), or the like, or any combination thereof.

As noted above, the pet toy 100 may be configured to provide a dynamic playing experience and have multiple configurations capable of providing different playing functionalities. In a first configuration, the toy assembly 150 may be coupled to the cord 140 so as to hang or dangle from the shaft 120. In some examples, the cord 140 may be coupled to the distal end 122 of the shaft 120, such that the toy assembly 150 hangs or dangles from the distal end 122 of the shaft 120. In other examples, the cord 140 may be coupled to the shaft 120 at another position, and thus, the toy assembly 150 may hang or dangle from another position on the shaft 120. For example, the cord 140 may be coupled to a midpoint of the shaft 120 and the toy assembly 150 may hang or dangle from the midpoint of the shaft 120.

In the first configuration, a human may hold the handle 110 of the pet toy 100 so as to dangle the toy assembly 150 in front of a pet, enticing the pet to bat at or otherwise play with the toy assembly 150. As noted above, the toy assembly may include one or more of bright colors, contrasting colors, unique textures, contrasting textures, cat nip, an attractant (e.g., a feather, faux fur), a noisemaker, or the like configured to attract or capture the attention of a pet.

In the first configuration, a human may move the shaft 120, thus moving the toy assembly 150, as they play with the pet. For example, a human may move the shaft 120, thus moving the toy assembly 150, as a pet bats at the toy assembly 150. In some examples, as noted above, the shaft 120 of the pet toy 100 may include a coiled portion 160. In these examples, the coiled portion 160 may elastically deform as the human moves the shaft 120. Accordingly, when the human stops moving the shaft 120, the coiled portion 160 may cause the toy assembly 150 to bounce or sway as the coiled portion 160 returns to its original or undeformed shape.

Figure 4:
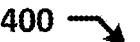
FIG. 4 illustrates a flowchart for launching a toy assembly in accordance with one example of the present disclosure.
Figure 4:
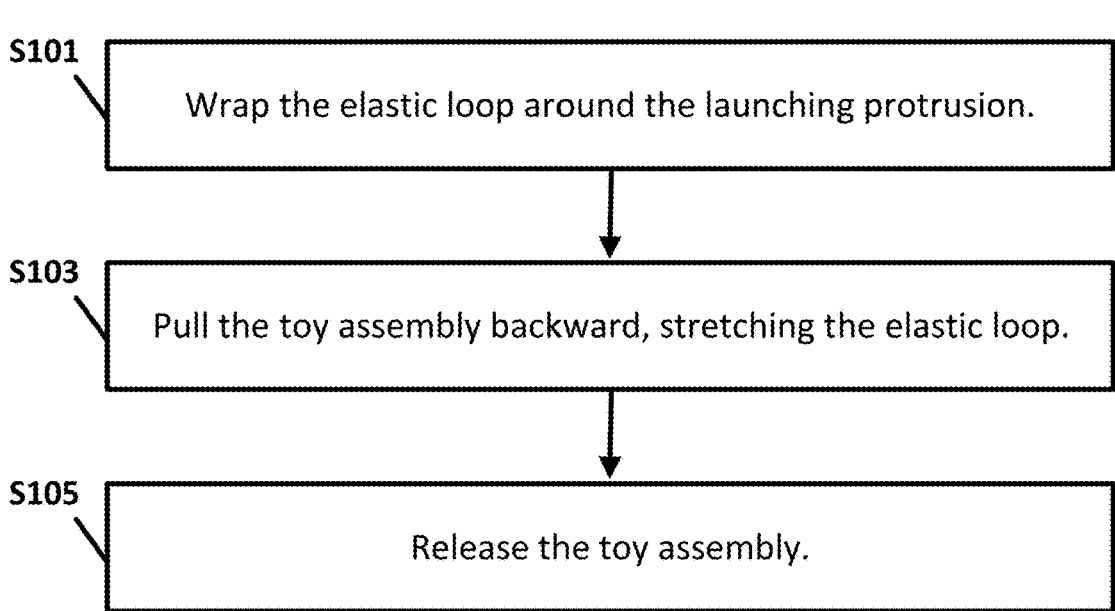

Referring to FIG. 4, a flowchart 400 for launching the toy assembly 150 in the second configuration of the pet toy 100 is illustrated in accordance with one example of the present disclosure. Different, fewer, or additional acts may be provided. The flowchart 400 may be implemented in the order shown, but also may be implemented in or according to any number of different orders.

In a first act S101, the elastic loop 152 of the toy assembly 150 may be wrapped or provided around the launching protrusion 130. In some examples, the elastic loop 152 may be provided within a notch 240 formed between a projection 230 and the body 210 of the shaft 120. In some examples, a human may hold the handle 110 of the pet toy 100 in a first hand and hold the toy assembly 150 in a second hand while wrapping the elastic loop 152 around the launching protrusion 130. In another example, the loop 152 may be non-elastic. In this case, the non-elastic loop 152 may still be wrapped or provided around the launching protrusion 130 as described above.

In a second act S103, toy assembly 150 may be pulled backwards, stretching the elastic loop 152. Specifically, the toy assembly 150 may be pulled backward, for example, toward a human holding the pet toy 100. As the toy assembly 150 is pulled backward, the elastic loop 152 may be stretched against the launching protrusion 130. The elastic loop 152 may be elastically deformed into a stretched state as the toy assembly 150 is pulled backward. In another example, such as when the loop 152 is a non-elastic loop, when the toy assembly 150 is pulled backwards, the loop 152 does not stretch, but rather the coiled portion 160 of the shaft 120 does, as described below.

In some examples, such as when the loop 152 is a non-elastic loop, a coiled portion 160 of the shaft 120 may be elastically deformed as the toy assembly 150 is pulled backwards. Specifically, the coiled portion 160 may be disposed between the handle 110 and the launching protrusion 130, such that when the toy assembly 150 is pulled backward against the launching protrusion 130, the coiled portion 160 elastically deforms.

In a third act S105, the toy assembly 150 may be released while in a stretched state. When the toy assembly 150 is released while in a stretched state, an elastic force of the elastic loop 152 returning to its original (e.g., natural, unstretched) state may act on the launching protrusion 130 propelling or launching the toy assembly 150 forward or backward, away from a human holding the pet toy 100. In the third act S105, a user may release the toy assembly 150 held in one hand, while continuing to hold the handle 110 of the pet toy 100 in another hand. When released, an elastic force of the elastic loop 152 returning to its original state may act against the launching protrusion 130, a position of which is maintained by a user holding the handle 110 of the pet toy 100, propelling or launching the toy assembly 150 forward or backward. In another example, such as when the loop 152 is non-elastic, releasing the toy assembly 150 may still cause the toy assembly 150 to be propelled away from the launching protrusion 130, as described below.

In some examples, such as when the loop 152 is non-elastic, when a coiled portion 160 of the shaft 120 has been deformed as the toy assembly 150 is pulled backward, an elastic force of the coiled portion 160 may cause the coiled portion to return to its original (e.g., natural, unstretched, or unbent) state. Further, an elastic force of the coiled portion 160 returning to its original state may be exerted via the launching protrusion 130 on the toy assembly 150 (e.g., the loop 152), either supplementing the elastic force of the elastic loop 152 or providing the elastic force of the loop 152 (when the loop 152 is non-elastic) and propelling or launching the toy assembly 150 forward.

In the second configuration, a pet may be attracted to or enticed to chase after a toy assembly 150 launched from the launching protrusion 130. As noted above, the toy assembly 150 may include one or more of bright colors, contrasting colors, unique textures, contrasting textures, cat nip, an attractant (e.g., a feather, faux fur), a noisemaker, or the like configured to attract or capture the attention of a pet and entice a pet toy chase after an toy assembly 150 launched from the launching protrusion 130.

Figure 5:
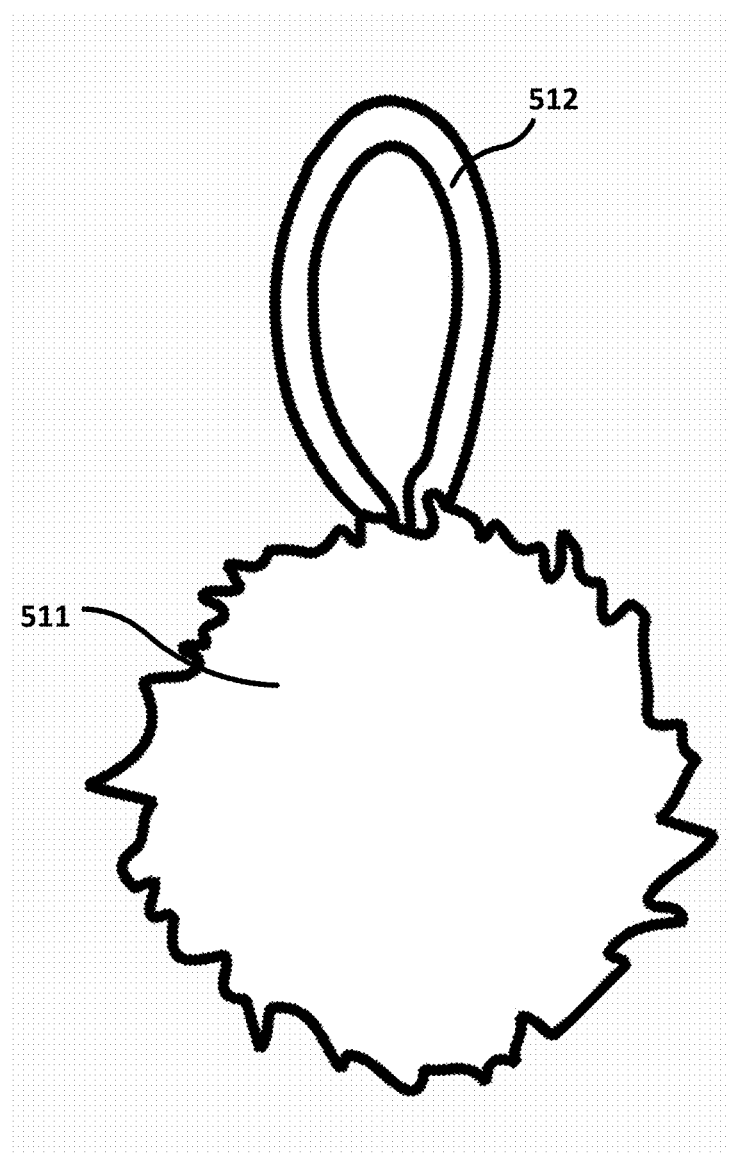
FIG. 5 illustrates a pet toy assembly in accordance with another example of the present disclosure.

Referring to FIG. 5, a toy assembly 510 is illustrated in accordance with another example of the present disclosure. As shown in FIG. 5, the toy assembly 510 may include a body 511 and a loop 512. In one example, the loop 512 may be elastic. The body 511 and the elastic loop 512 may be the same as the body 151 and elastic loop 152, respectively, as described above with respect to FIG. 1. As shown in FIG. 5, in some examples, the toy assembly 510 may have a round or sphere shape. Specifically, as shown in FIG. 5, the body 511 of the toy assembly 510 may have a sphere shape. In one example, the body 511 of the toy assembly 510 may be a noisemaker, such as a crinkle ball made from crinkly material that provides sound and texture to entice a pet to play.

For clarity of disclosure, the terms "proximal" and "distal" are defined herein relative to a point of attachment of an element of the present disclosure. The term "proximal" refers to the position of an element closer to the point of attachment. The term "distal" refers to the position of an element further away from the point of attachment.

While the present disclosure has been described with reference to specific examples, which are intended to be illustrative only and not to be limiting of the disclosure, it should be apparent to those of ordinary skill in the art that changes, additions and/or deletions may be made to the disclosed embodiments without departing from the spirit and scope of the disclosure.

The foregoing description is given for clarity of understanding only, and no unnecessary limitations should be understood therefrom, as modifications within the scope of the disclosure may be apparent to those having ordinary skill in the art.

When a component, device, element, or the like of the present disclosure is described as having a purpose or performing an operation, function, or the like, the component, device, or element, should be considered herein as being "configured to" meet that purpose or perform that operation or function.

What is claimed is:

1. A pet toy comprising:
a handle;
a shaft extending from the handle, the shaft including:

a launching protrusion extending away from a primary axis along which the shaft extends, the launching protrusion including a projection such that a notch is formed between the projection and the shaft; and
a coiled portion disposed between the handle and the launching protrusion;
a cord coupled to a distal end of the shaft opposite the handle; and
a toy assembly removably attachable to the cord and engageable with the launching protrusion,
wherein in a first configuration of the pet toy, the toy assembly is removably coupled to the cord and in a second configuration of the pet toy, the toy assembly is launchable from the launching protrusion.

2. The pet toy of claim 1, wherein the toy assembly includes:
a body; and
an elastic loop coupled to the body, the elastic loop configured to be removably coupled to the cord in the first configuration and wrapped around and stretched against the launching protrusion in the second configuration.

3. The pet toy of claim 2, wherein the body includes:
a cover; and
an internal compartment disposed within the cover.

4. The pet toy of claim 3, wherein the body includes cat nip disposed within the internal compartment.

5. The pet toy of claim 2, wherein the toy assembly includes an attractant coupled to the body.

6. The pet toy of claim 1, wherein the coiled portion of the shaft is configured to deform when the elastic loop is stretched against the launching protrusion.

7. The pet toy of claim 1, wherein the notch is configured to receive a portion of the toy assembly.

* * * * *